June 16, 1964 E. VALENTE 3,137,227
COFFEE-MAKING MACHINE FOR DISPENSING LARGE AND SMALL QUANTITIES OF COFFEE
Filed June 20, 1962
2 Sheets-Sheet 1
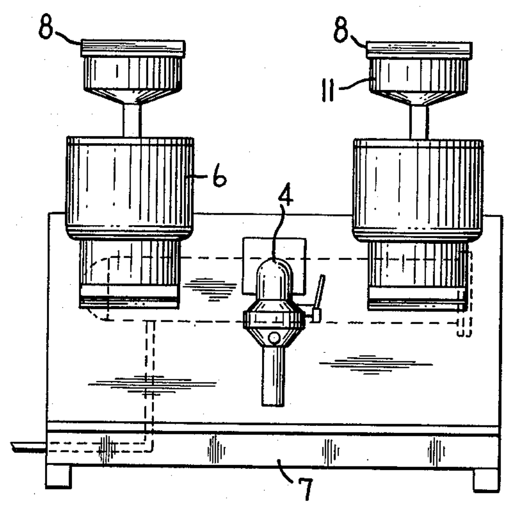
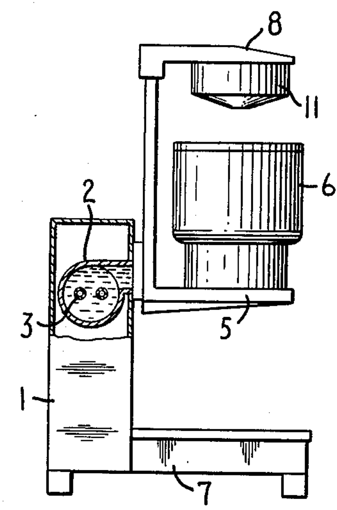
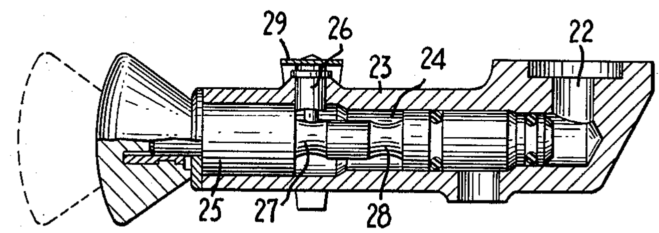

June 16, 1964
E. VALENTE
COFFEE-MAKING MACHINE FOR DISPENSING LARGE AND SMALL QUANTITIES OF COFFEE
3,137,227
Filed June 20, 1962
2 Sheets-Sheet 2
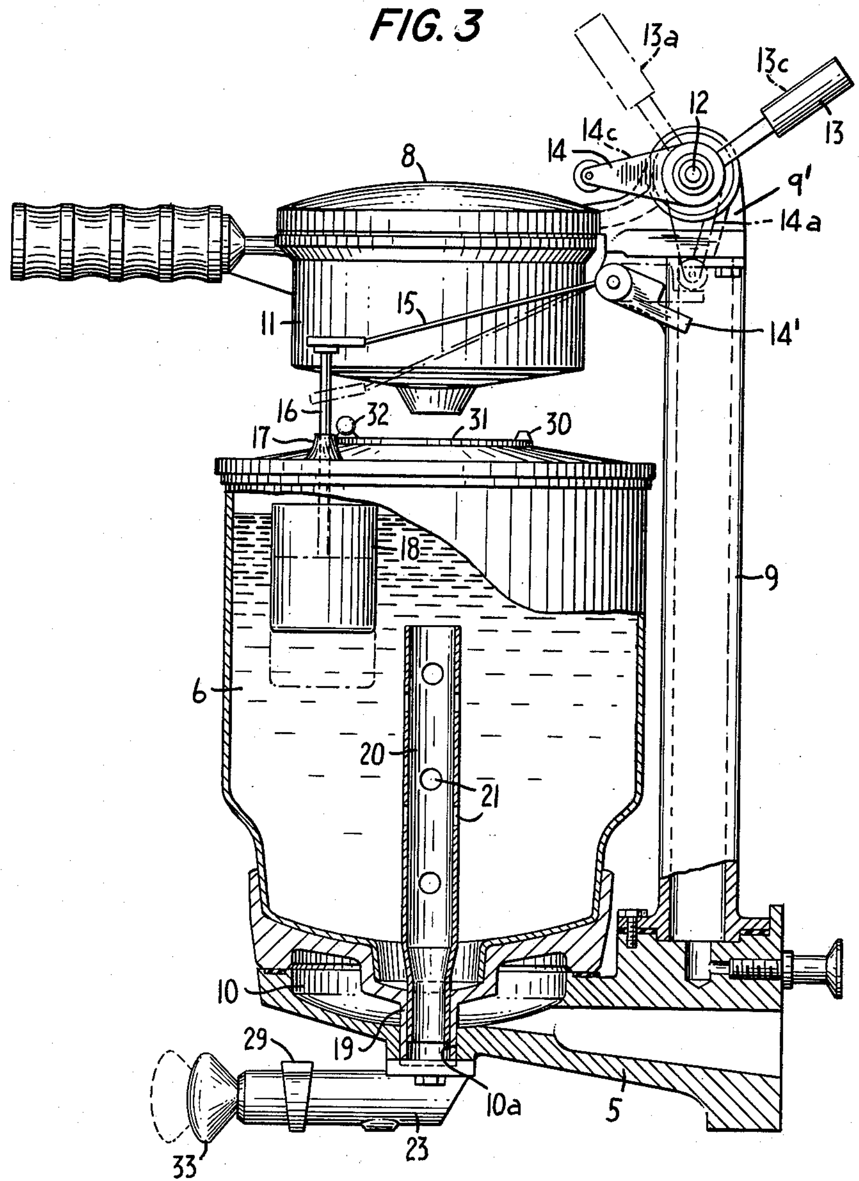

United States Patent Office 3,137,227

Patented June 16, 1964

3,137,227

COFFEE-MAKING MACHINE FOR DISPENSING LARGE AND SMALL QUANTITIES OF COFFEE

Ernesto Valente, Via G. Ventura 5, Milan, Italy

Filed June 20, 1962, Ser. No. 203,964
Claims priority, application Italy June 20, 1961
2 Claims. (Cl. 99—283)

In Mediterranean countries coffee drinkers generally prefer freshly prepared coffee, even adapting themselves to a long wait during rush hours, where the shop keeper tries to obviate the inconvenience of long waits by using simultaneously several working distribution units.

Nevertheless, in other cases, and especially in northern countries, coffee drinkers like to taste already prepared beverage, but which is kept warm, thereby avoiding long waits and thus permitting the shop keeper to prepare a supply of coffee before rush hours and to make better use of the coffee-making machine and staff.

A principal object of this invention is the provision of a coffee machine, which perfectly meets the above requirements of coffee drinkers and produces an excellent beverage relative to temperature, clearness and taste. Apparatus according to the invention also meets the different requirements of those hours where requests for the beverage are not many and well spaced in time.

To enable the invention to be fully understood it will now be described with reference to the accompanying drawings in which:

FIG. 1 is a front elevation view illustrating one embodiment of the invention in diagrammatic form which omits certain details of like right and left hand infusors, which are shown in FIGS. 3 and 4;

FIG. 2 is a side view partly in section of the apparatus shown in FIG. 1;

FIG. 3 is a side view, in part section, of an infusion unit on an enlarged scale;

FIG. 4 is a sectional view of a distributing cock of the container in FIG. 3 on an enlarged scale.

Referring to the accompanying drawing, the functional parts, for example coffee dispensing means and means for supplying water thereto as hereinafter explained, are supported and enclosed by a cabinet with an L-shaped section, in whose vertical portion 1 is disposed a horizontal, cylindrical boiler 2 for infusion water heated by electrical resistance element 3. The boiler 2 supports, centered thereon, a conventional unit 4 with a holder for a filter (not shown) for continuous dispensing of two cups of coffee.

On each side of this unit 4 there is disposed a bracket 5. The unit and bracket extend out from the vertical wall of the portion 1 on the operator's side, above a horizontal extension 7 of the cabinet, which serves as a support for the cups to be filled. Each bracket 5 (see FIG. 3) is hollow and presents a cup-like end portion 10, having an upper rim and this end portion communicates, as shown by the patent to Valente, 2,874,630, with the water chamber of the boiler through two pipes, not shown, on different levels. A vessel or container 6 is supported on said end portion for storing finished coffee. The container has a bottom resting on and fitted in a water-tight condition on said upper rim, so that in the end portion of the bracket a hot water thermosiphon circulation is possible from the boiler to the end portion. A connection flow from the boiler to the end portion and back to the boiler is established in view of the cooling of the water taking place in the end portion. This flow keeps the end portion warm.

A pipe 9 is fixed on bracket 5 extending upwardly from the bracket. A hollow arm 9' extends horizontally from and closes the upper end of said pipe. The arm has a bell-like end portion having a lower rim placed above said container 6.

The filter holder has an upper rim removably connected in a water-tight connection in the said lower rim. The interior of the bell-like end portion is connected through the hollow arm and a cock 12, with the pipe 9, which communicates with the water space of the boiler.

The container 6 is supplied with a cap 31, openable to receive the beverage coming from a filter holder 11.

Filter, filter holder and bell have larger sizes than the corresponding ones of the central conventional unit 4, in order to contain the quantity of coffee powder necessary for the preparation of a larger number of cups of coffee. The coffee-making apparatus comprises a cock 12 which is operated manually with a handle 13, which in the drawing is shown in a closed position 13*c* shown in solid lines, and in opened position 13*a* in broken lines.

The handle 13 and the cock 12 are kept in a closed position by a return spring, not shown, and can be opened by manual engagement of a lever 14 with a hook-shaped end or dent 14' of a two armed lever 15 mounted on pipe 9. The arm 15 is controlled by a stem 16 extending outwardly of the container 6 through an opening in a boss 17 on a container. The stem 16 is connected to a float 18 in the container 6 sensing the liquid level therein. When the container is not filled the lever 14 is in its position 14*a* in which the cock 12 is open and when the container is filled to a proper level the float rises and the lever arm 15 is moved from its position shown in broken lines to its position shown in solid lines in which the detent 14' is in a position shown in solid lines releasing the lever arm 14 so that the cock 12 is restored automatically to a closed position and the lever 14 moves to a position 14*c*.

The bottom of container 6 has an axially bored hub 19, extending through a sole 10*a* formed centrally in the bottom of the cup-like end portion 10 of the bracket 5. The hub bore is connected to a tube 20 which extends upwardly into the interior of the container and is provided with radial holes 21, distributed spaced a certain height from the bottom. The spacing of the radial holes 21 from the bottom of the container precludes the serving of any sediment when coffee is distributed. The bore of the hub communicates with the hole 22 of the distributing tap 23. This tap 23 is drilled axially in orthogonal direction with respect to the hole 22.

In this axial hole 24 is disposed a rod 25 movable between two extreme positions to a "closed" and "open" position of the tap (corresponding to the positions of a knob 33 indicated in the drawing in solid and broken lines) determined by a radial detent 26 which engages respectively the notches 27 and 28 under the pressure of a spring 29 fixed outside body 23.

The machine, according to the present invention, solves the above problems and makes an excellent beverage without any inconvenience. Apparatus according to the invention eliminates factors prejudicial to the goodness of the beverage, as well as sedimentation due to the substances suspended in the infusion since the distribution of coffee is made at a certain height from the bottom of the container. Moreover, the container and distributing tap are easy and quickly cleaned.

What I claim is:

1. In an apparatus for making coffee, in combination, a boiler, an infusion and distributing unit connected to said boiler for substantially instantaneously preparing coffee, an attachment comprising a hollow bracket having a cup-like end portion in communication with said boiler for maintaining said cup-like end portion warm with a supply of warm water thereto, a vessel for storing finished coffee, seated in said end portion and supported thereon for keeping the coffee warm in said vessel with heat supplied from said end portion, said vessel comprising an open extension on the bottom thereof, said end portion having a central recess for receiving said extension, a coffee dispensing tap connected on said end portion in communication with said open extension for dispensing coffee from said vessel, an infusion unit mounted above said vessel for supplying batches of finished coffee to said vessel for storage therein for mass supply therefrom, said vessel having an upper opening openable for receiving finished coffee from said infusion unit, a pipe extending upwardly from said bracket and having a lower end connected for hot water flow from said bracket, a hollow arm extending horizontally from and closing the upper end of said pipe, said arm having a bell-like end portion defining said infusion unit placed above said vessel, the interior of said bell-like end communicating through said horizontal hollow arm with said pipe, a valve for opening and closing supply of heated water from said upwardly extending pipe to the interior of said bell-like end portion, means actuatable selectively manually for opening said valve, said vessel comprising a tube having one end in communication with said opening in the bottom of said vessel and having an open end extending upwardly spaced from the bottom of said vessel, and said tube having openings spaced axially therefrom and spaced axially upwardly from the interior bottom of said vessel.

2. In an apparatus for making coffee according to claim 1, in which said means for opening said valve comprises a manually operable lever, a detent for precluding operation of said valve to a closed position when said vessel is not substantially filled to a selected level, and a float sensing the level of finished coffee in said vessel for automatically rendering said detent effective and ineffective.

References Cited in the file of this patent

UNITED STATES PATENTS

| | | |
|---|---|---|
| 181,943 | Johnston | Sept. 5, 1876 |
| 359,401 | Pabst | Mar. 15, 1887 |
| 1,171,800 | Muller | Feb. 15, 1916 |
| 1,706,190 | Shroyer | Mar. 19, 1929 |
| 2,464,862 | Herrera | Mar. 22, 1949 |
| 2,547,254 | Braithwaite | Apr. 3, 1951 |
| 2,603,236 | Brown | July 15, 1952 |
| 2,874,630 | Valente | Feb. 24, 1959 |

FOREIGN PATENTS

| | | |
|---|---|---|
| 356,987 | Italy | Feb. 24, 1938 |
| 429,483 | Italy | Jan. 27, 1948 |